United States Patent [19]

Mizutome et al.

[11] Patent Number: 5,894,297
[45] Date of Patent: Apr. 13, 1999

[54] DISPLAY APPARATUS

[75] Inventors: Atsushi Mizutome, Fujisawa; Hideo Kanno, Yokohama; Akira Tsuboyama, Atsugi, all of Japan

[73] Assignee: Canon Kabushiki Kaisha, Tokyo, Japan

[21] Appl. No.: 08/270,307

[22] Filed: Jul. 5, 1994

Related U.S. Application Data

[63] Continuation of application No. 07/928,741, Aug. 13, 1992, abandoned.

[30] Foreign Application Priority Data

Aug. 28, 1991 [JP] Japan .................. 3-240257

[51] Int. Cl.$^6$ .................................................. G09G 3/36
[52] U.S. Cl. .................. 345/99; 345/97; 345/211
[58] Field of Search .......................... 345/87, 94, 90, 345/98, 211, 55, 80, 56, 97, 204, 208, 209, 99; 364/707; 348/634; 349/133

[56] References Cited

U.S. PATENT DOCUMENTS

| | | | |
|---|---|---|---|
| 4,217,579 | 8/1980 | Havada et al. | 345/204 |
| 4,271,404 | 6/1981 | Taraka | 340/365 |
| 4,648,055 | 3/1987 | Ishijaka et al. | 364/557 |
| 4,655,561 | 4/1987 | Kanbe et al. | 359/56 |
| 4,691,200 | 9/1987 | Stephany | 340/784 |
| 4,693,563 | 9/1987 | Harada et al. | 340/784 DZ |
| 4,695,838 | 9/1987 | Ellis, Jr. | 340/798 |
| 5,058,994 | 10/1991 | Mihara et al. | 340/784 |
| 5,059,961 | 10/1991 | Cheng | 340/720 |
| 5,091,723 | 2/1992 | Kanno et al. | 340/784 |
| 5,107,354 | 4/1992 | Yamazaki et al. | 359/56 |
| 5,345,250 | 9/1994 | Inoue et al. | 345/100 |
| 5,592,191 | 1/1997 | Tsuboyama et al. | 345/97 |
| 5,606,343 | 2/1997 | Tsuboyama et al. | 345/97 |
| 5,642,128 | 6/1997 | Inoue | 345/97 |

FOREIGN PATENT DOCUMENTS

| | | | |
|---|---|---|---|
| 1295228 | 11/1989 | Japan | 345/94 |
| 290484 | 11/1989 | Japan | 364/707 |

OTHER PUBLICATIONS

"I.B.M. Technical Disclosure Bulletin" Apr. 1973 pp. 3437–3438.

*Primary Examiner*—Lun-Yi Lao
*Attorney, Agent, or Firm*—Fitzpatrick, Cella, Harper & Scinto

[57] ABSTRACT

A display apparatus comprises a display panel 18 in which scan signal electrodes and information signal electrodes are arranged in a matrix form and a liquid crystal having a memory performance is sandwiched between them, a drive circuit 15 and 17 for applying scan signals to the scan signal electrodes and for applying information signals to the information signal electrodes, image information memory 9 for storing image information to be displayed by the display panel, a detector for detecting that the image information to be stored into the image information memory is changed, a determination circuit for determining a period of time to detect that the image information has been changed and a drive controller 12 for controlling the drive circuit in accordance with the result of the detection.

2 Claims, 2 Drawing Sheets

DISPLAY APPARATUS

This application is a continuation, of application Ser. No. 07/928,741 filed Aug. 13, 1992, now abandoned.

BACKGROUND OF THE INVENTION

1. Field of the Invention

The invention relates to a control method of a display apparatus and, more particularly, to a control method suitable to display video information by using a display apparatus with a liquid crystal having a memory performance in a liquid crystal display apparatus in which scan signal lines and information signal lines are arranged in a matrix form and are driven by applying scan signals and information signals to those signal lines, respectively.

2. Related Background Art

Hitherto, as a computer terminal display apparatus, a CRT of the refresh scan type has mainly been used. A frame frequency of 60 Hz or higher is used in order to prevent flickering (of the screen). A non-interlacing method is used in order to improve visibility of a moving display (movement of a mouse, an icon, or the like) of information on the screen. Therefore, as display resolution rises, a high power is required and a drive control unit also increases in size and cost. For instance, in case of a television, an interlacing method is used for convenience of the display of a moving image and a drive control system, a field frequency is set to 60 Hz, and a frame frequency is set to 30 Hz.

In recent years, as a computer terminal display apparatus, attention has been paid to a flat panel display in consideration of the inconvenience such as large size and high power of the CRT mentioned above.

At present, as a flat panel display, there are several methods such as a high time-division method (STN) of twisted nematic liquid crystal, a black and white display method (NTN) as a modification of the STN method, a plasma display method, and the like. However, the flat panel display of each of the above methods uses the same image data transfer method as the CRT and also uses the non-interlacing method having a frame frequency of 60 Hz or more as a picture plane updating method. This is because each of those display panels does not have the memory performance on the display principle, so that a refresh cycle of the frame frequency of 60 Hz or higher is needed from a viewpoint of prevention of flickering. On the other hand, even in a method (TFT, MIN, TFD, or the like) in which a switching transistor or a non-linear element is formed in each pixel of the twisted nematic liquid crystal, the image information can be held within at most one frame. Therefore, a refresh cycle of 60 Hz or more is necessary in a manner similar to the above methods.

On the other hand, since a ferroelectric liquid crystal display apparatus has a feature such that the image information which has once been displayed can be held (memory performance), it is possible to display a fairly larger screen at a higher precision than those of the various kinds of display apparatuses mentioned above. However, since the frame frequency at which the apparatus can be driven is low, in order to cope with the display apparatus of the main-machine interface, a partial rewriting scanning (only the scan lines whose image information is changed are scanned (driven)) method using the memory performance is necessary. As such a partial rewriting scanning method, a method such as "the low frame frequency driving (multi interlace scan) +the partial rewriting scan" to display at a high resolution in a display apparatus having the memory performance has been realized as proposed in U.S. Pat. Nos. 5,058,994 and 5,091,723 by Mihara et al., and the like on the basis of the method proposed in, for example, U.S. Pat. No. 4,665,561 by Kanbe et al., or the like.

In the conventional control method of the ferroelectric liquid crystal display device, when there is a change in image information, the partial rewriting scan is executed, and when there is no change, the whole screen refresh scan by the multi interlace or the like is executed. Therefore, for example, even in a state in which the operator leaves his seat or the like and a key input or an operation by the mouse is not performed for a long time, the display panel continuously executes the refresh scan by the multi interlace or the like.

As mentioned above, as one of the major features, the ferroelectric liquid crystal display apparatus has the memory performance and, fundamentally, when there is no change in image information, the display state can be held without performing the refresh scan (driving). According to the conventional drive control method, however, even in a state such that the key input or the mouse operation is not executed for a long time, it is impossible to perform a control such as to keep the display content by stopping the scan (driving) of the display panel, that is, by setting the display panel into the memory state.

SUMMARY OF THE INVENTION

The invention is made in consideration of the problems in the above conventional apparatuses and it is an object of the invention to provide a liquid crystal display apparatus of a large screen, a high precision, a lower electric power consumption, and a higher reliability.

To accomplish the above object, according to the invention, there is provided a display apparatus comprising: a display panel in which scan signal electrodes and information signal electrodes are arranged in a matrix form and a liquid crystal having a memory performance is sandwiched between them; drive means for applying scan signals to the scan signal electrodes and for applying information signals to the information signal electrodes; image information memory means for storing image information to be displayed by the display panel; means for detecting that the image information which is stored into the image information memory means is changed; means for determining a period of time which is required to detect the change in image information; and drive control means for controlling the drive means in accordance with the result of the detection.

DETAILED DESCRIPTION OF THE PREFERRED EMBODIMENTS

Figure 1:
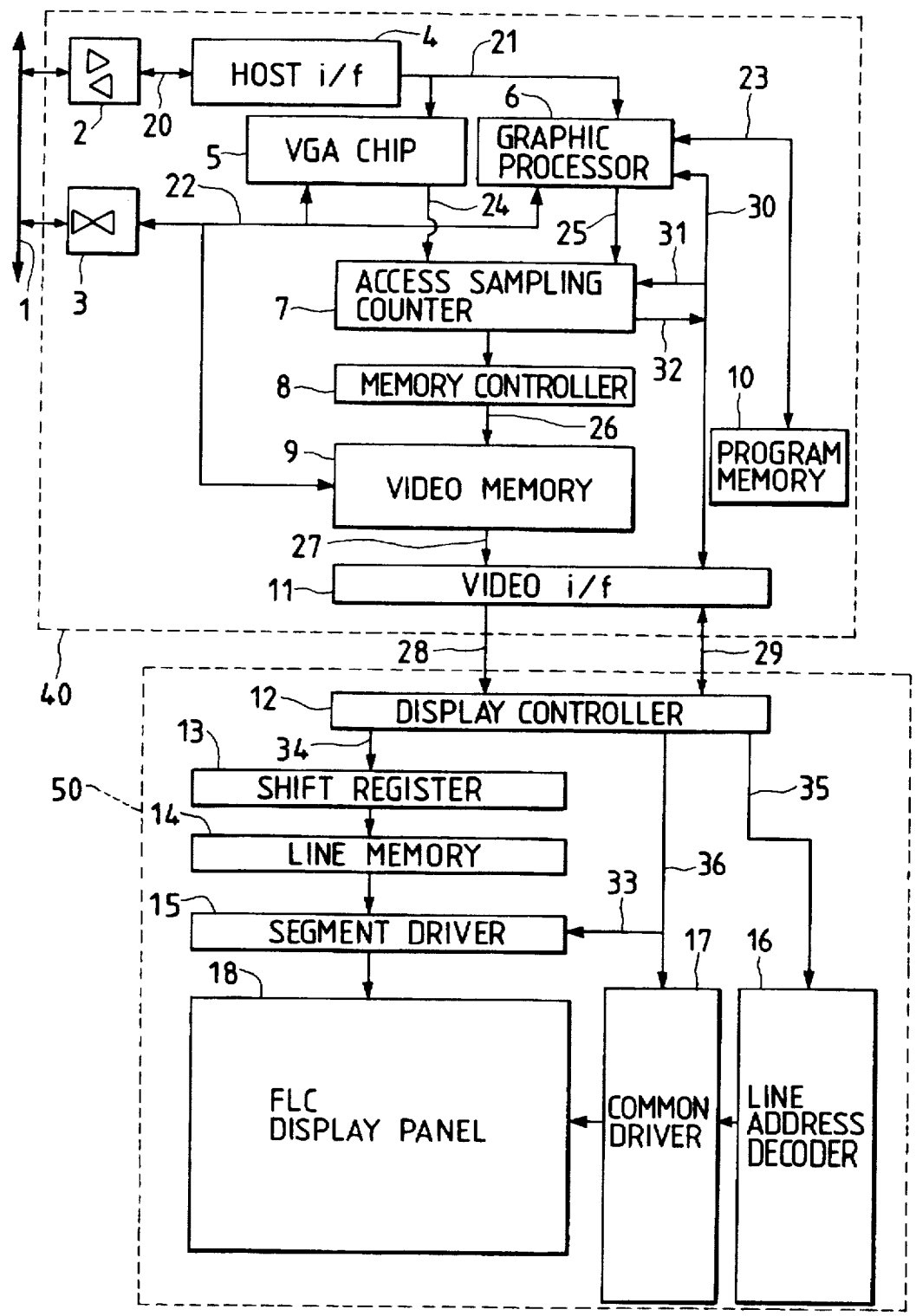
FIG. 1 is a block diagram of a display apparatus according to an embodiment of the invention.

FIG. 1 is a block diagram showing an embodiment of the invention. In the diagram, reference numeral 1 denotes a system bus; 40 an FLC display control circuit; and 50 an FLC display unit.

In the FLC display control circuit 40, reference numeral 2 denotes a driver to generate an address request signal, an access request signal, a response signal, and the like; 3 a data buffer; 4 a host interface as an interface circuit between a host CPU and a processor in the control circuit; 5 a VGA (Video Graphics Array) supporting chip as a special LSI to support a VGA register or the like; 6 a graphic processor to draw an image and to transfer data; 10 a program memory which is constructed by a dynamic RAM or the like to store a program for the graphic processor; 9 a video memory; 7 an access sampling counter which is reset by the access signal to the video memory 9; 8 a memory controller to generate a control signal to the video memory 9 to store display information; 11 a video interface to transmit and-receive video data, a sync signal, and the like between the FLC display unit 50 and the FLC display control circuit 40; 20 a request signal of an address or an access, a response signal, and the like; 21 an access signal to the VGA supporting chip 5 and the graphic processor 6; 23 data which is transmitted and received between the graphic processor 6 and the program memory 10; 22 data which is transmitted and received between the data buffer 3 and the VGA supporting chip 5, graphic processor 6, and video memory 9; 24 an access request to the video memory 9 which is transmitted from the VGA supporting chip 5 to the memory controller 8; 25 an access request to the video memory 9 which is transmitted from the graphic processor 6 to the memory controller 8; 26 a control signal to the video memory 9; 27 display data which has been read out from the video memory 9; 28 data which is sent to the FLC display unit; 29 a sync signal and a control signal which are transmitted and received between the FLC display control circuit 40 and the FLC display unit 50; 30 a sync signal and a control signal; 31 a sync signal which is supplied to the access sampling counter 7; and 32 a notification signal to notify that the video memory 9 is not accessed for a predetermined time or more.

In the FLC display unit 50, reference numeral 12 denotes a display controller to execute whole control of the display unit 50 such as interface with the FLC display control circuit 40, control of both of a segment driver and a common driver, and the like; 13 a shift register to transfer video data of one line from the display controller 12; 14 a line memory to store video data of one line; 15 a segment driver to generate a predetermined drive waveform to the information electrode of a display panel 18 at a predetermined timing in accordance with the video data in the line memory; 18 the display panel using a ferroelectric liquid crystal (FLC); 16 a line address decoder to select one scan line in accordance with scan line address data from the display controller 12; 17 a common driver to generate a predetermined drive waveform to the selected scan line (scan electrode) at a predetermined timing; 34 video data; 35 scan line address data; and 33 and 36 control lines to the segment driver 15 and common driver 17, respectively.

The fundamental operation of the screen display in the embodiment of the invention will now be described with reference to FIG. 1.

① The case where the host CPU updates the display screen (the case where the operator executes the ordinary operation)

In the ordinary CRT control circuit, the host CPU can directly access the video memory at random. In the FLC display control circuit according to embodiment of the invention, however, the host CPU cannot directly access the video memory at random and executes the rewriting or the like of the display data through the graphic processor 6. For instance, in the case of displaying a straight line, the host CPU generates a straight line drawing command to the graphic processor 6 and gives necessary information such as start point, end point, and the like. The graphic processor 6 determines the access address or the like in accordance with the given information and accesses the video memory 9. The display of another figure, character, or the like or a command regarding the VGA is also similarly executed by a method whereby the graphic processor 6 or VGA supporting chip 5 accesses the video memory 9 by a command (as a BIOS command in case of the VGA) from the host CPU.

The access sampling counter 7 monitors the access state to the video memory 9. When the access (writing) to the video memory 9 is not executed for a predetermined time or longer, the counter 7 generates the notification signal 32 indicative of such a non-access state to the FLC display unit 50. When the graphic processor 6 or VGA supporting chip 5 accesses the video memory 9, the access sampling counter 7 is reset and again starts the counting operation from the beginning. In case of ① (the case where the operator performs the ordinary operation), the access to the video memory 9 is continuously being executed, so that the notification signal 32 is not generated from the access sampling counter 7.

The display data in the video memory 9 is read out line by line from the video memory 9 by an instruction from the graphic processor 6 and is supplied together with scan line address data (not shown on the control circuit side in FIG. 1) to the FLC display unit 50 through the video interface 11. In this instance, an image drawing event is judged by either one of the methods whereby the graphic processor 6 discriminates from the given image drawing command whether the data is the data in which a high response speed is required, namely, the image information in which the partial rewriting is needed or not and the method whereby the host CPU gives identification information indicating whether the data is the data in which the partial rewriting is necessary or not to the graphic processor 6. The display data in which a high response speed of the display is required for the FLC display is preferentially transferred. The display controller 12 in the FLC display unit 50 receives the scan line address data and display data (video data) from the FLC display control circuit 40. The scan line address data 35 is transferred to the line address decoder 16 of the scan electrode drive circuit (13 to 15). The video data 34 is transferred to the shift register 13 of the information electrode drive circuit (16 to 17). The line address decoder 16 of the scan electrode drive circuit selects one scan line on the basis of the scan line address data 35. The common driver 17 generates a predetermined drive waveform to the selected scan line (scan electrode) for a selecting period of time (one horizontal scan period). On the other hand, after the video data of one line was shifted, the shift register 13 of the information electrode drive circuit transfers the video data to the line memory 14 and holds for one horizontal scan period. The segment driver 15 generates the drive waveform according to the video data in the line memory 14 synchronously with the selecting period of the common driver 17. As mentioned above, in the writing operation to the display panel in the ordinary operating mode, with respect to the image drawing information in which a high response speed is required in particular as a man-machine interface as in the cursor movement, character input, screen scroll, or the like, the partial rewriting scan is executed by a generally well-known line sequential scan, and with respect to the other image drawing information, the whole screen refresh scan by the multi-interlace or the like is performed.

② The case where the host CPU doesn't update the display screen for a predetermined time or more In this case, the FLC display panel is controlled into the memory state by the notification signal 32 from the access sampling counter 7. The access sampling counter 7 is a counter in which the access (write) signal to the video memory 9 is used as a reset (or preset) signal and the sync signal 31 (for example, a horizontal sync signal) from the FLC display unit 50 is used as a clock. An overflow (carry) signal of the access sampling counter 7 is used as a notification signal 32 indicating that the video memory 9 is not accessed for the predetermined time or more. Actually, one frame time (for instance, the horizontal sync signal ×1024 on the assumption that the number of scan lines is set to 1024) is counted from the sync signal 31 (horizontal sync signal) and is frequency divided into 1/64 and the resultant frequency divided signal is supplied as a clock to an 8-bit counter (access sampling counter). Now, assuming that the standard horizontal scan time of the FLC display unit 50 is equal to 100 μsec, a period of clock is equal to about 6.5 seconds (100 μsec×1024×64) and a detecting time can be set to a value within a range from about six seconds to about 27 minutes in accordance with the preset value (1 to 256) of the counter. When the video memory is not accessed for such a set detecting time, the access sampling counter 7 asserts the notification signal 32 (sets into the enable state), thereby informing the display controller 12 of the fact that the access to the video memory 9 is stopped (there is no change in screen display). The notification signal 32 is generated asynchronously with the driving of the display panel 18. When the display controller 12 recognizes that the notification signal 32 has been asserted, the apparatus waits for the completion of the driving of the scan electrode which is at present being scanned (because the signal 32 is received asynchronously). After completion of the driving of the scan electrode, a drive waveform generation stop signal (included in control lines 33 and 36) is sent to both of the segment driver and the command driver. For a period of time when the drive waveform generation stop signal is asserted, both of the output terminals of the segment driver and common driver to the FLC display panel are held at the same potential, thereby controlling the panel into the non-scanning state (state in which the panel is not scanned although a voltage has been applied thereto). Each of the segment driver 15 and the common driver 17 has a function to control the output terminal into a high impedance (electrically disconnected) state. Therefore, as a method of setting the FLC display panel into the memory state, in addition to the above method of keeping the information electrode and the scan electrode to the same potential, it is also possible to use a method whereby the output terminals are set into the high impedance state as a complete non-driving state (such words are purposely used in order to distinguish from the "non-scanning state" mentioned above). Either proper one of the methods of setting the display panel into the memory state can be selected by the control from the display controller 12.

The operation when the display panel is returned from the memory state to the normal driving state will now be described. When the video memory 9 is accessed at least once, the access sampling counter 7 immediately negates the notification signal 32 (sets into the disable state), thereby informing the display controller 12 of the fact that the video memory 9 has been accessed (there is a write request). In a manner similar to the case of asserting, since the notification signal 32 is generated asynchronously with the driving (scan) of the display panel 18, the display controller 12 waits for the completion of the driving of the scan electrode which is at present being scanned (synchronously with the scan of the display panel). After completion of the driving of the scan electrode, the drive waveform generation stop signals (33 and 36) to both of the segment driver and the common driver are negated, thereby returning the panel into the normal driving state (state of "the partial rewriting scan +the whole screen refresh scan" described in ①)

Figure 2:
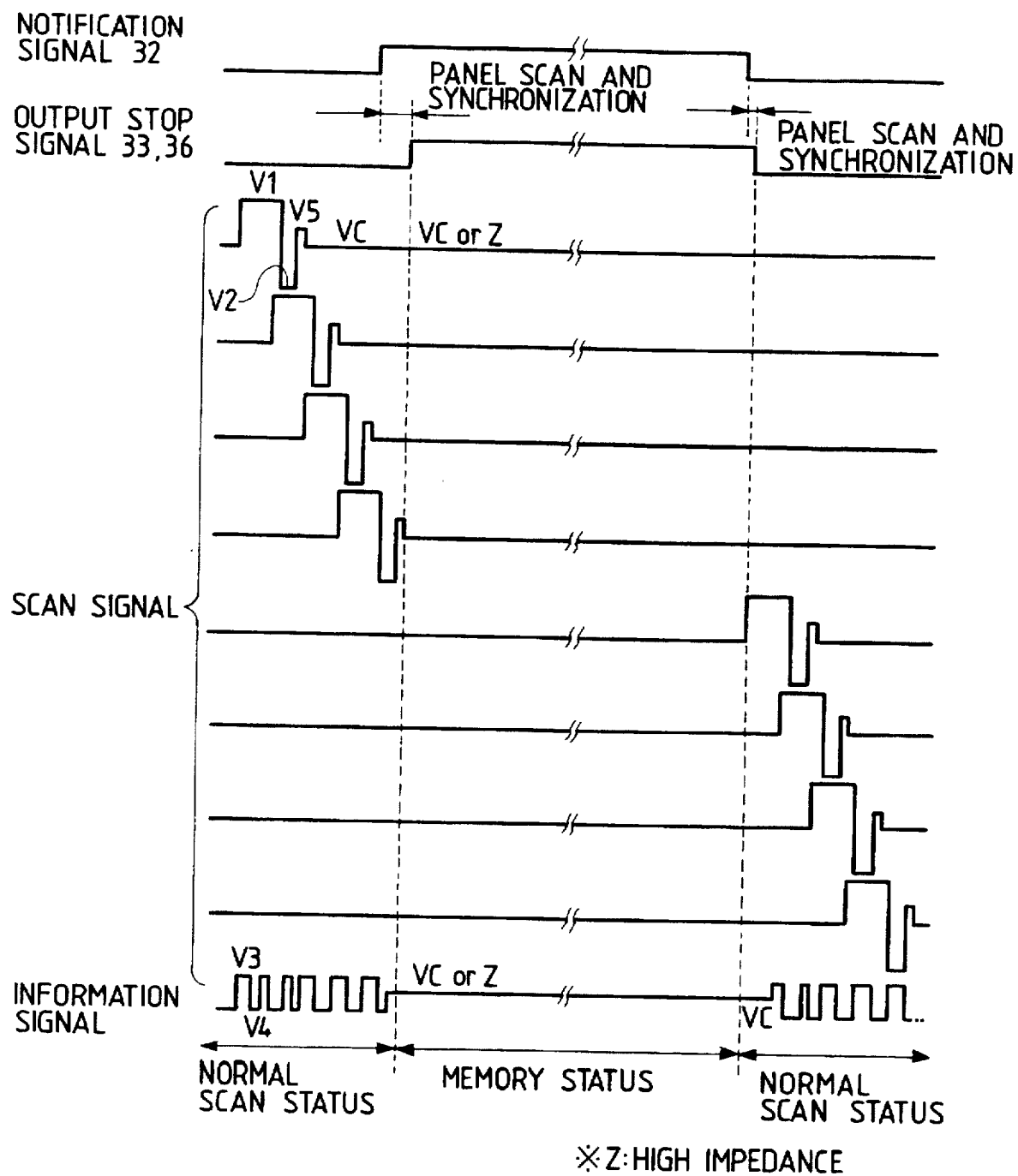
FIG. 2 is a timing chart when a display panel in FIG. 1 is controlled into a memory state.

FIG. 2 shows the scan signals (drive waveforms which are applied to the scan electrode group and the information signals (drive waveforms) which are applied to the information electrode group when the display panel is shifted from the normal state to the memory state and when the display panel is returned from the memory state to the normal state. The scan electrode drive waveform which is generated from the common driver 17 performs the writing operation by the writing panel on the negative voltage side (voltage level: $V_2$) after all of the lines (one scan line) was once erased by an erase pulse on the positive voltage side (voltage level: $V_1$). The write pulse is synchronized with the information electrode drive waveform (voltage level: $V_3$) which is generated from the segment driver 15. When the synthesized waveform of those waveforms exceeds a write threshold value, the display panel is shifted from the erasing state to another state. When it doesn't exceed the threshold value, the erasing state is held. By divisionally writing two states within the selecting period (horizontal scan period) and by repeating the above operation with respect to all of the scan lines, a desired image drawing is obtained. In FIG. 2, for a period of time when the notification signal 32 from the access sampling counter 7 is asserted (High level), the display controller 12 sets the outputs of both of the segment driver and the common driver into the same potential (voltage level: VC here) or high impedance state (shown by Z in FIG. 2) and the display panel is held in the memory state.

A time which is required to "set the FLC display panel into the memory state" or "return the FLC display panel from the memory state to the normal scanning state" is at most within one horizontal scanning time (about 100 μsec) of the display panel. Therefore, the control (switching between the scanning state and the memory state) of such a display panel never causes a sense of disorder to the operator.

As described above, by using the construction as in the embodiment as a control method of displaying the video information by using the liquid crystal display panel having the memory performance, with respect to the image drawing information in which a high response speed is required in particular as a man-machine interface such as cursor movement, character input, screen scroll, or the like, the line corresponding to the display can be preferentially transferred to the FLC display and can be selectively drawn (driven) and, when the access (writing) operation to the video memory is not performed for a predetermined time or more, the scan (driving) of the display panel is stopped and an electric power consumption of the whole system can be reduced.

According to the invention, when there is no change in image information for the detecting period of time, the drive control means can control the drive means in a manner such that the scan of the display panel is stopped by controlling the voltages which are applied to the scan electrode and the information electrode to the same potential or the driving of the display panel is stopped by controlling the scan electrode and the information electrode into the high impedance state.

A ferroelectric liquid crystal (FLC) can be mentioned as an example of the liquid crystal having the memory performance.

In the invention, in order to display video information by using the liquid crystal display panel having the memory performance, fundamentally, the driving method of "the low frame frequency driving (multi interlace scan) +the partial rewriting scan" mentioned above is used. The drive means is controlled so as to stop the refresh of the display panel when there is no change in image information for a predetermined period of time. Therefore, an electric power to refresh is unnecessary and the electric power consumption can be reduced.

On the other hand, by stopping the refreshing operation, an accumulation time at which the driving voltage is applied to the liquid crystal device is remarkably reduced. Deteriorations of the electric parts and the junction portion or a deterioration of the image quality of the liquid crystal device (a burning phenomenon of the image, a fluctuation of the optimum driving condition of the liquid crystal, or the like) are suppressed. The reliability of the liquid crystal device can be improved.

What is claimed is:

1. A display apparatus comprising:

a display panel comprising a plurality of pixel units each comprising a couple of opposing electrodes and liquid crystal sandwiched between said couple of opposing electrodes, wherein said pixel units are arranged in a plurality of rows and columns, the pixels on each row being connected via a common scan signal line and the pixels on each column being connected via a common information signal line;

image information memory means for storing image information to be displayed by said display panel;

detection means for detecting a change in the image information stored in said information memory means per a predetermined period of time; and drive control means for controlling driving so that, when said detection means detects a change in image information during the predetermined period of time, a rewrite scanning of scanning lines for rewriting only the change in image information is executed, and whole image frame refresh scanning is executed during a period of time in which rewrite scanning drive is not executed, and for terminating the whole image frame refresh scanning by setting a voltage to be applied to all information signal lines and a voltage to be applied to all scanning signal lines at the same potential after no new change in image information has been detected by said detection means for the predetermined period of time, thereby to freeze a picture without erasing on said display panel until a new change in image information.

2. An apparatus according to claim 1, wherein said liquid crystal is a ferroelectric liquid crystal.

* * * * *

UNITED STATES PATENT AND TRADEMARK OFFICE
CERTIFICATE OF CORRECTION

PATENT NO. : 5,894,297
DATED : April 13, 1999
INVENTOR(S) : ATSUSHI MIZUTOME, ET AL.

It is certified that error appears in the above-identified patent and that said Letters Patent is hereby corrected as shown below:

TITLE PAGE:

AT [56] REFERENCES CITED

FOREIGN PATENT DOCUMENTS

"1295228" should read --1-295228--.

COLUMN 1

Line 23, "a" should be deleted; and
Line 65, "(multi interlace" should read
--(multi-interlace--.

COLUMN 2

Line 13, "multi interlace" should read --multi-interlace--.

COLUMN 3

Line 9, "and-receive" should read --and receive--.

COLUMN 4

Line 63, "doesn't" should read --does not--.

COLUMN 6

Line 3, "☉)" should read --☉).--.

UNITED STATES PATENT AND TRADEMARK OFFICE
CERTIFICATE OF CORRECTION

PATENT NO. : 5,894,297

DATED : April 13, 1999

INVENTOR(S) : ATSUSHI MIZUTOME, ET AL.

It is certified that error appears in the above-identified patent and that said Letters Patent is hereby corrected as shown below:

COLUMN 7

Line 1, "(multi interlace" should read --(multi-interlace--.

Signed and Sealed this

Twenty-first Day of December, 1999

Attest:

Q. TODD DICKINSON

*Attesting Officer*  *Acting Commissioner of Patents and Trademarks*